(12) United States Patent
Grubbs

(10) Patent No.: US 12,017,565 B2
(45) Date of Patent: Jun. 25, 2024

(54) ROTATABLE VEHICLE SEAT ASSEMBLY

(71) Applicant: Brooky Grubbs, Wingate, IN (US)

(72) Inventor: Brooky Grubbs, Wingate, IN (US)

(*) Notice: Subject to any disclaimer, the term of this patent is extended or adjusted under 35 U.S.C. 154(b) by 0 days.

(21) Appl. No.: 17/895,359

(22) Filed: Aug. 25, 2022

(65) Prior Publication Data

US 2024/0067060 A1 Feb. 29, 2024

(51) Int. Cl.
B60N 2/28 (2006.01)
B60N 2/90 (2018.01)
A47C 3/18 (2006.01)

(52) U.S. Cl.
CPC ......... B60N 2/2869 (2013.01); B60N 2/2821 (2013.01); B60N 2/90 (2018.02); A47C 3/18 (2013.01)

(58) Field of Classification Search
CPC ............................ B60N 2/2869; B60N 2/2821
See application file for complete search history.

(56) References Cited

U.S. PATENT DOCUMENTS

| | | | |
|---|---|---|---|
| 4,936,629 A | 6/1990 | Young | |
| 4,971,392 A * | 11/1990 | Young | B60N 2/2821 297/256.13 |
| 5,183,312 A * | 2/1993 | Nania | B60N 2/146 248/425 |
| 5,318,339 A * | 6/1994 | Cherniak | B60N 2/245 297/250.1 |
| 5,380,062 A * | 1/1995 | Nania | B60N 2/2869 297/256.13 |
| 5,482,354 A | 1/1996 | Gryp | |
| 6,015,188 A * | 1/2000 | Yundt | B60N 2/6054 297/344.21 |
| 6,572,189 B1 | 6/2003 | Blaymore | |
| 6,896,330 B1 * | 5/2005 | Yu | A47C 15/00 297/344.21 |
| 7,073,859 B1 | 7/2006 | Wilson | |
| D574,636 S | 8/2008 | Peng | |
| 8,007,043 B1 * | 8/2011 | Vuong | B60N 2/2821 297/256.16 |
| 9,090,182 B2 * | 7/2015 | Rabeony | B60N 2/2863 |
| 9,415,702 B2 | 8/2016 | Auger | |
| 9,550,454 B1 * | 1/2017 | Roisen | G08B 21/24 |
| 10,449,876 B2 * | 10/2019 | Lonstein | B60N 2/2875 |

FOREIGN PATENT DOCUMENTS

AU 2022200286 B1 * 1/2023 ........... B60N 2/2821

* cited by examiner

Primary Examiner — Syed A Islam

(57) ABSTRACT

A rotatable vehicle seat assembly for interchangeable seats having a charging port includes a top. The top base encloses an interior defining a space for a locking mechanism to be positioned within. The locking mechanism includes a plurality of latches and a lever. The bottom base has a ball bearing rotating the top base relative to the bottom base. The bottom base includes a slot for inserting a seat belt through, a port providing electrical current, and a battery providing electric current to the port. Furthermore, a pair of straps protrudes out from the bottom base for retaining the bottom base to a bench seat. Either a padded seat or a car seat is positioned upon the top base.

16 Claims, 8 Drawing Sheets

ROTATABLE VEHICLE SEAT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to rotatable seat device and more particularly pertains to a new rotatable seat device for interchangeable seats having a charging port.

(2) Description of Related Art Including Information Disclosed Under 37 CFR 1.97 and 1.98

The prior art relates to rotatable seat devices. The prior art includes a variety of rotatable seat devices configured for be positioned within a car and have swivel capabilities. Known prior art lacks a rotatable seat device being interchangeable from a car seat to a padded seat and having a charging port and a pair of straps for use on a bench if needed.

BRIEF SUMMARY OF THE INVENTION

An embodiment of the disclosure meets the needs presented above by generally comprising a top base being a first portion of the rotatable car seat assembly. The top base has a top surface and a bottom surface and a wall positioned between the top surface and the bottom surface. The wall encloses an interior defining a space for a locking mechanism to be positioned within. The locking mechanism further includes a plurality of latches. Each of the latches has an indent wherein the indent of each of the latches is positioned facing a center of the top surface of the top base. A lever is coupled to a latch of the plurality of latches and is pulled to move the indents of the latches away from the center of the top surface of the top base. A bottom base is a second portion of the rotatable car seat assembly. The bottom base has a top surface and a bottom surface and a wall. The top surface of the bottom base has a ball bearing being configured for rotating the top base relative to the bottom base. The bottom base further includes a slot being configured for inserting a seat belt through. In addition, the bottom base includes a port being positioned on the wall of the bottom base. The port is configured for providing electrical current. A battery is in electric communication with the port wherein the battery is configured for providing electric current to the port. Furthermore, a pair of straps protrudes out from the wall of the bottom base and is configured for retaining the bottom base to a bench seat. A padded seat is positioned upon the top surface of the top base or a car seat is positioned upon the top surface of the top base. The car seat is configured for securing a child within the car seat.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
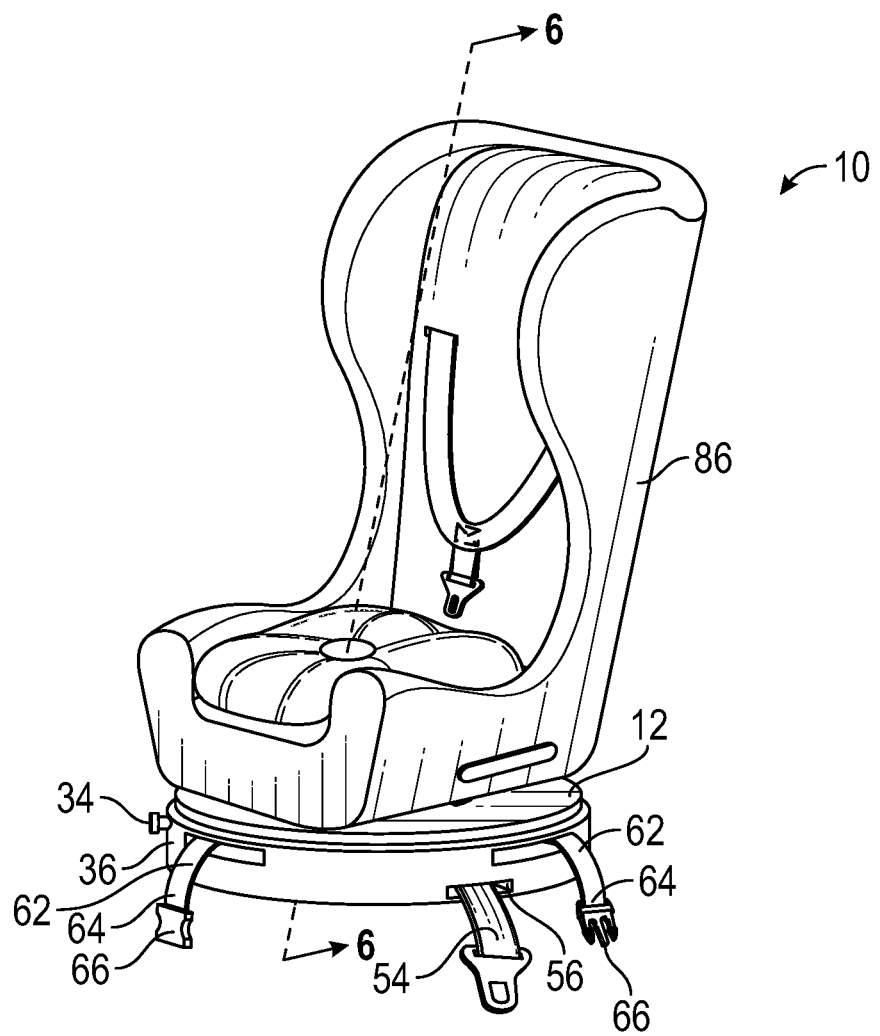
FIG. 1 is a top isometric view of a rotatable vehicle seat assembly according to an embodiment of the disclosure.
Figure 2:
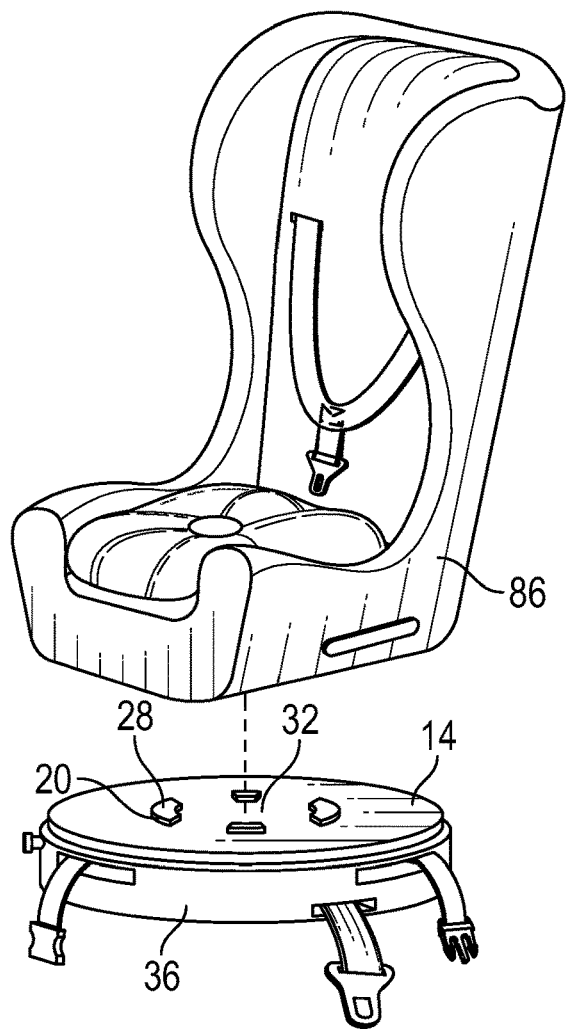
FIG. 2 is an exploded view of an embodiment of the disclosure.
Figure 3:
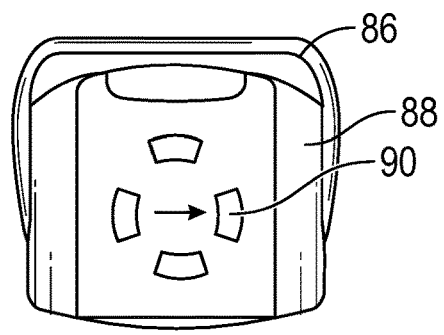
FIG. 3 is a bottom view of an embodiment of the disclosure.
Figure 4:
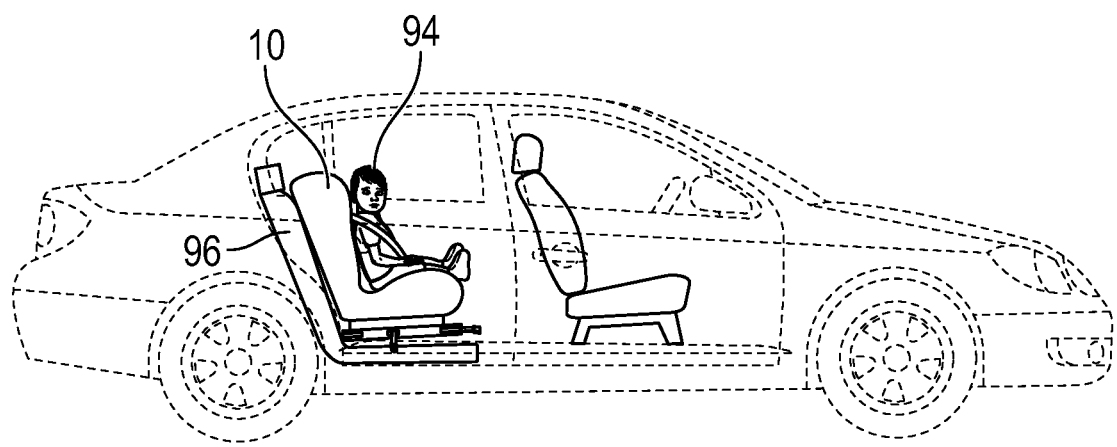
FIG. 4 is a side in-use view of an embodiment of the disclosure.
Figure 5:
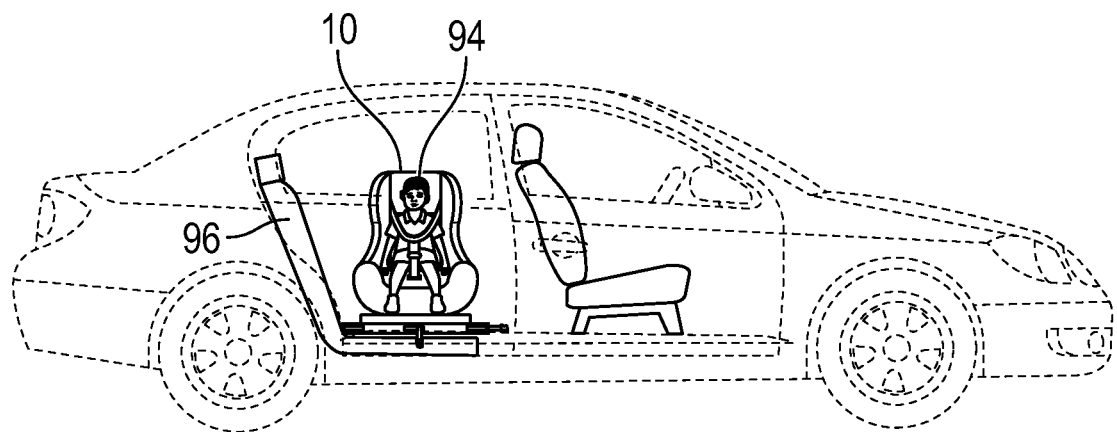
FIG. 5 is a side in-use view of an embodiment of the disclosure.
Figure 6:
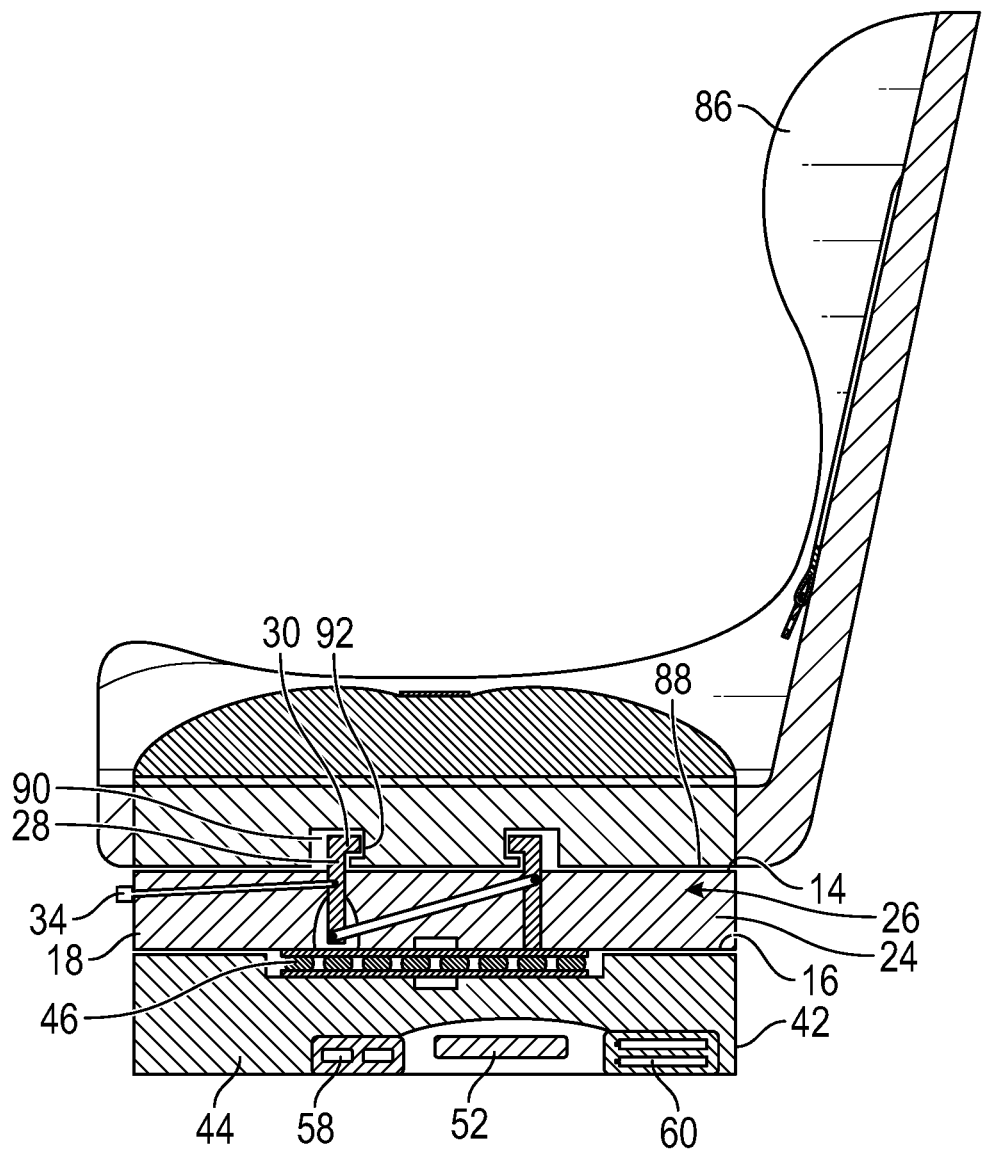
FIG. 6 is a cross-sectional view of an embodiment of the disclosure taken from FIG. 1 of Line 6-6.
Figure 7:
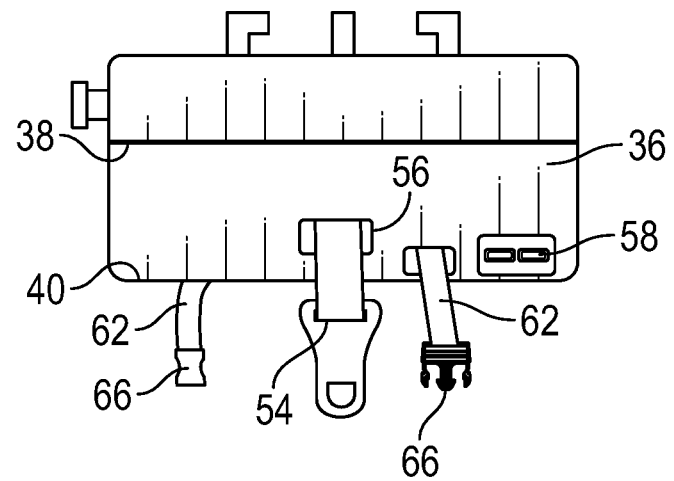
FIG. 7 is a front view of an embodiment of the disclosure.
Figure 8:
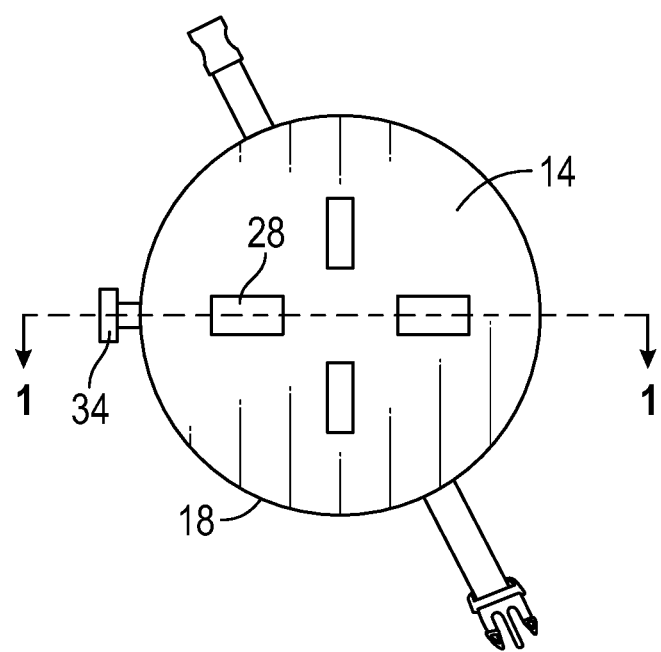
FIG. 8 is a top view of an embodiment of the disclosure.
Figure 9:
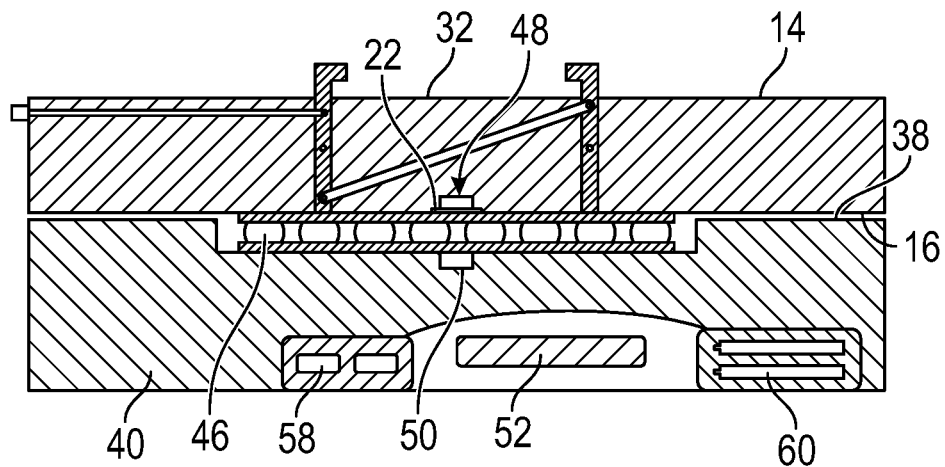
FIG. 9 is a cross-sectional view of an embodiment of the disclosure taken from FIG. 8 of Line 9-9.
Figure 10:
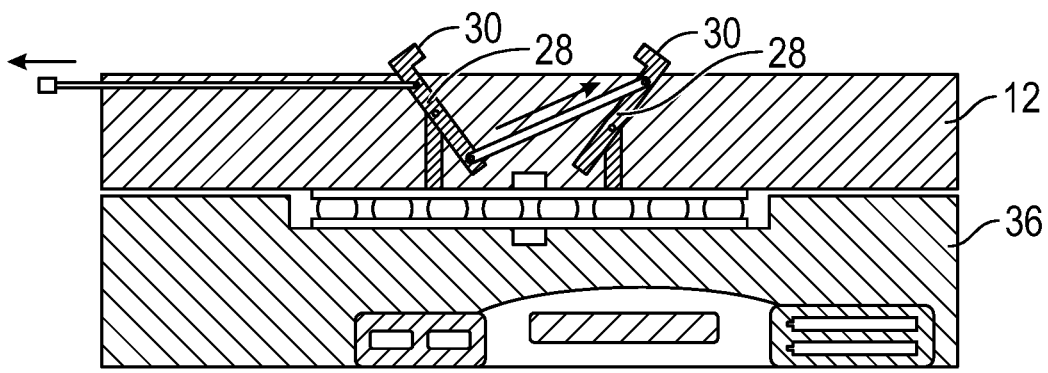
FIG. 10 is a cross-sectional view of an embodiment of the disclosure.
Figure 11:
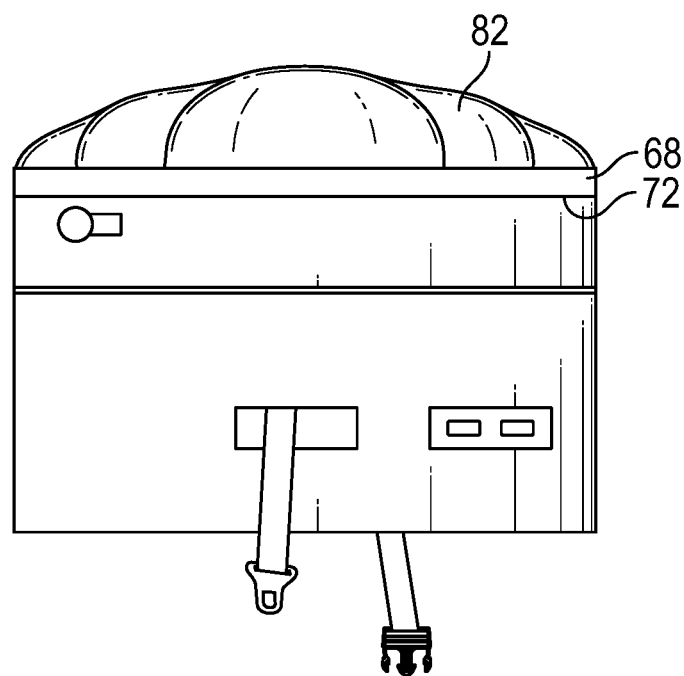
FIG. 11 is an exploded view of an embodiment of the disclosure.
Figure 12:
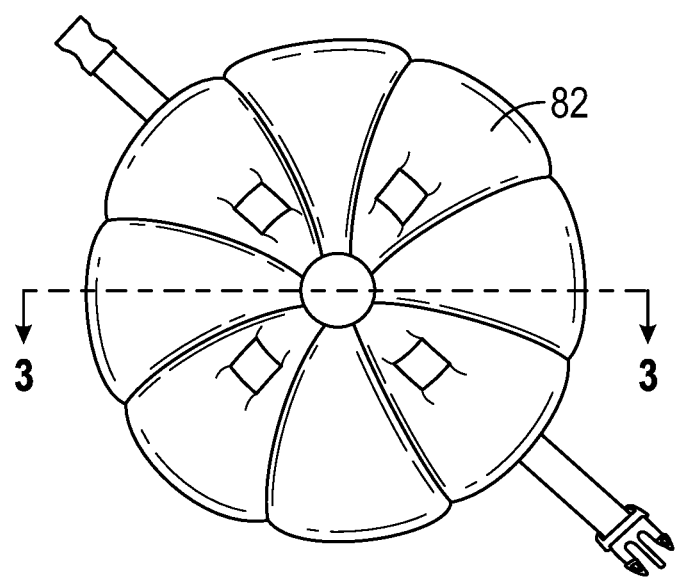
FIG. 12 is a top view of an embodiment of the disclosure.
Figure 13:
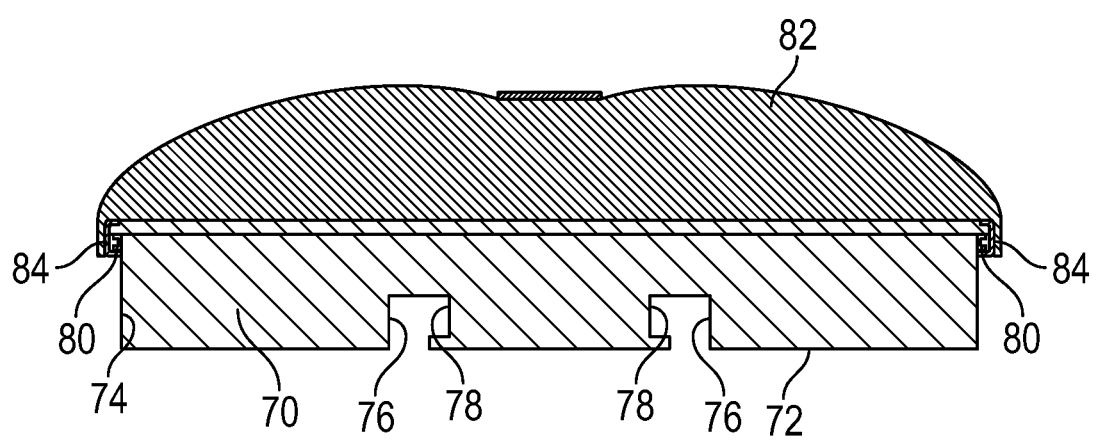
FIG. 13 is a cross-sectional view of an embodiment of the disclosure taken from FIG. 12 of Line 13-13.

With reference now to the drawings, and in particular to FIGS. 1 through 13 thereof, a new rotatable seat device embodying the principles and concepts of an embodiment of the disclosure and generally designated by the reference numeral 10 will be described.

As best illustrated in FIGS. 1 through 13, the rotatable vehicle seat assembly 10 generally comprises a top base 12. The top base 12 is a first portion of the rotatable vehicle seat assembly 10. The top base 12 is a cylindrical shape having a top surface 14, a bottom surface 16, and a wall 18 positioned between the top surface 14 and the bottom surface 16. The top surface 14 of the top base 12 has a plurality of apertures 20, and the bottom surface 16 of the top base 12 has a hole 22. The wall 18 encloses an interior 24 defining a space for a locking mechanism 26 to be positioned within.

Furthermore, the locking mechanism 26 includes a plurality of latches 28. Each of the latches 28 is positioned within a respective one of each of the apertures 20 of the top surface 14 of the top base 12. Each of the latches 28 has an indent 30 wherein the indent of each of the latches 28 is positioned facing a center 32 of the top surface 14 of the top base 12. Each of the latches 28 is in mechanical communication with each other. Additionally, a lever 34 is in mechanical communication with the plurality of latches 28. The lever 34 is coupled to a latch of the plurality of latches 28 and engages with each of the latches 28 by the latch coupled to the lever 34. The lever 34 is position on the wall 18 of the top base 12 and is pulled to move the indent 30 of each of the latches 28 away from the center 32 of the top surface 14 of the top base 12.

A bottom base 36 is a second portion of the rotatable vehicle seat assembly 10. The bottom base 36 has a top surface 38, a bottom surface 40, and a wall 42. The wall 42 of the bottom base 36 encloses an interior 44. The top surface 38 of the bottom base 36 is positioned abutting the bottom surface 16 of the top base 12. The top surface 12 of the bottom base 36 has a ball bearing 46, and the ball bearing 46 has a center 48. A bolt 50 is positioned within the center 48 of the ball bearing 46 and within the hole 22 of the top base 12 wherein coupling the top base 12 to the bottom base 36. The ball bearing 46 of the bottom base 36 is configured for rotating the top base 12 relative to the bottom base 36.

The bottom base 36 further includes a slot 52 being configured for inserting a seat belt 54 through. The slot 52 is a conduit having a pair of openings 56. The pair of openings 56 of the slot 52 is positioned on the wall 42 of the bottom base 36. In addition, a port 58 is positioned on the wall 42 of the bottom base 36. The port 58 is a universal serial bus port positioned proximate to the bottom surface 40 of the bottom base 36. The port 58 is configured for providing electrical current to a universal serial bus input inserted to it. Moreover, a battery 60 is in electric communication with the port 58. The battery 60 is positioned within the interior 44 of the bottom base 36 and is configured for being a disposable battery. The battery 60 is configured for providing electric current to the port 58. Furthermore, a pair of straps 62 protrudes out from the wall 42 of the bottom base 36. Each of the straps 62 is positioned coplanar to each other, and each of the straps 62 has an end 64. A pair of clasp lock fasteners 66 is positioned on a respective one of the end 64 of each of the straps wherein each of the straps 62 are configured for retaining the bottom base 36 to a bench seat.

A padded seat 68 is positioned upon the top surface 14 of the top base 12. The padded seat 68 has an upper surface 70, a lower surface 72, and a wall 74. The lower surface 72 of the padded seat 68 has a plurality of cavities 76, and each of the cavities 76 has a notch 78. The plurality of cavities 76 of the padded seat 68 is complementary to the plurality of latches 28 of the top base 12. The lower surface 72 of the padded seat 68 is configured for securing to the top surface 14 of the top base 12 by positioning the indent of each of the latches 28 in a respective one of the notch 78 of each of the cavities 76. Additionally, the padded seat 68 has a plurality of clasps 80 positioned on the wall 74. A padding 82 is positioned on the upper surface 70 of the padded seat 68. The padding 82 has a plurality of buttons 84 wherein each of the buttons 84 of the padding 82 engages by clasp button fastening 66 to a respective one of each of the clasps 80 of the padded seat 68.

A car seat 86 is positioned upon the top surface 14 of the top base 12. The car seat 86 has a locking surface 88, and the locking surface 88 has a plurality of cavities 90. Each of the cavities 90 has a notch 92, and the plurality of cavities 90 of the car seat 86 is complementary to the plurality of latches 28 of the top base 12. The locking surface 88 of the car seat 86 is configured for securing to the top surface 14 of the top base 12 by positioning the indent 30 of each of the latches 28 in a respective one of the notch 92 of each of the cavities 90. Furthermore, the car seat 86 is configured for securing a child 94 within.

In use, the bottom surface 40 of the bottom base 36 is positioned upon a vehicle seat 96. The seat belt 54 of the vehicle seat 96 is inserted through the pair of openings 56 of the slot 52 to retain the bottom base 36 to the vehicle seat 96. The car seat 86 is positioned upon the top surface 14 of the top base 12. The user pulls on the lever 34 of the top base 12 to position each of the latches 28 within a respective one of each of the cavities 90 of the car seat 86. Subsequently, the user pushes the lever 34 inward towards the top base 12 to position the indent 30 of each of the latches 28 within a respective one of the notch 92 of each of the cavities 90 of the car seat 86 wherein securing the car seat 86 to the top base 12. The car seat 86 secured to the top base 12 can swivel upon the bottom base 36. An electronic device can be charge by inserting a power cord into the port 58 of the bottom base 36. When the car seat 86 needs to be removed from the top base 12, the user pulls on the lever 34 and pulls the car seat 86 upward from the top surface 14 of the top base.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A rotatable vehicle seat assembly configured for attaching a variety of car seats to be swiveled, said rotatable vehicle seat assembly comprising:
a top base being a first portion of said rotatable vehicle seat assembly, said top base having a top surface and a bottom surface, said top base having a wall positioned between said top surface and said bottom surface, said wall enclosing an interior, said interior defining a space for a locking mechanism to be positioned within, said locking mechanism further including:
- a plurality of latches, each of said latches having an indent, said indent of each of said latches being positioned facing a center of said top surface of said top base; and
- a lever being in mechanical communication with said plurality of latches, said lever being pulled to move said indents of said latches away from said center of said top surface of said top base;

a bottom base being a second portion of said rotatable vehicle seat assembly, said bottom base having a top surface and a bottom surface, said bottom base having a wall, said top surface of said bottom base having a ball bearing, said ball bearing of said bottom base being configured for rotating said top base relative to said bottom base, said bottom base further including:
- a slot being configured for inserting a seat belt through;
- a port being positioned on said wall of said bottom base, said port being configured for providing electrical current;
- a battery being in electric communication with said port, said battery being configured for providing electric current to said port; and
- a pair of straps protruding out from said wall of said bottom base, said pair of straps being configured for retaining said bottom base to a bench seat; and
- one of a padded seat and a car seat being positioned upon said top surface of said top base.

2. The rotatable vehicle seat assembly of claim 1, further comprising said top base being a cylindrical shape.

3. The rotatable vehicle seat assembly of claim 1, further comprising said top surface of said top base having a plurality of apertures, said bottom surface of said top base having a hole.

4. The rotatable vehicle seat assembly of claim 3, further comprising each of said latches being positioned within a respective one of each of said apertures of said top surface of said top base.

5. The rotatable vehicle seat assembly of claim 4, further comprising each of said latches being in mechanical communication with each other.

6. The rotatable vehicle seat assembly of claim 5, further comprising said lever being coupled to a latch of said plurality of latches, said lever being position on said wall of said top base, said lever engaging with each of said latches by said latch coupled to said lever.

7. The rotatable vehicle seat assembly of claim 6, further comprising said wall of said bottom base enclosing an interior, said top surface of said bottom base being positioned abutting said bottom surface of said top base.

8. The rotatable vehicle seat assembly of claim 7, further comprising said ball bearing having a center, a bolt being positioned within said center of said ball bearing and said hole of said top base wherein coupling said top base to said bottom base.

9. The rotatable vehicle seat assembly of claim 8, further comprising said slot being a conduit, said slot having a pair of openings, said pair of openings of said slot being positioned on said wall of said bottom base.

10. The rotatable vehicle seat assembly of claim 9, further comprising said port being a universal serial bus port, said port being positioned proximate to said bottom surface of said bottom base.

11. The rotatable vehicle seat assembly of claim 10, further comprising said battery being positioned within said interior of said bottom base, said battery being configured for being a disposable battery.

12. The rotatable vehicle seat assembly of claim 11, further comprising each of said straps being positioned coplanar to each other, each of said straps having an end, a pair of clasp lock fasteners being positioned on a respective one of said end of said pair of straps.

13. The rotatable vehicle seat assembly of claim 12, further comprising said padded seat having an upper surface and a lower surface, said padded seat having a wall, said lower surface of said padded seat having a plurality of cavities, each of said cavities having a notch, said plurality of cavities of said padded seat being complementary to said plurality of latches of said top base, said lower surface of said padded seat being configured for securing to said top surface of said top base by positioning said indent of each of said latches in a respective one of said notch of each of said cavities.

14. The rotatable vehicle seat assembly of claim 13, further comprising said padded seat having a plurality of clasps positioned on said wall, a padding being positioned on said upper surface of said padded seat, said padding having a plurality of buttons, each of said buttons of said padding engaging by clasp button fastening to a respective one of each of said clasps of said padded seat.

15. The rotatable vehicle seat assembly of claim 14, further comprising said car seat having a locking surface, said locking surface having a plurality of cavities, each of said cavities having a notch, said plurality of cavities of said car seat being complementary to said plurality of latches of said top base, said locking surface of said car seat being configured for securing to said top surface of said top base by positioning said indent of each of said latches in a respective one of said notch of each of said cavities.

16. A rotatable vehicle seat assembly configured for attaching a variety of car seats to be swiveled, said rotatable vehicle seat assembly comprising:
- a top base being a first portion of said rotatable vehicle seat assembly, said top base being a cylindrical shape, said top base having a top surface and a bottom surface, said top base having a wall positioned between said top surface and said bottom surface, said top surface of said top base having a plurality of apertures, said bottom surface of said top base having a hole, said wall enclosing an interior, said interior defining a space for a locking mechanism to be positioned within, said locking mechanism further including:
  - a plurality of latches, each of said latches being positioned within a respective one of each of said apertures of said top surface of said top base, each of said latches having an indent, said indent of each of said latches being positioned facing a center of said top surface of said top base, each of said latches being in mechanical communication with each other; and
  - a lever being in mechanical communication with said plurality of latches, said lever being coupled to a latch of said plurality of latches, said lever being position on said wall of said top base, said lever engaging with each of said latches by said latch coupled to said lever, said lever being pulled to move said indents of said latches away from said center of said top surface of said top base;
- a bottom base being a second portion of said rotatable vehicle seat assembly, said bottom base having a top surface and a bottom surface, said bottom base having a wall, said wall of said bottom base enclosing an interior, said top surface of said bottom base being positioned abutting said bottom surface of said top base, said top surface of said bottom base having a ball bearing, said ball bearing having a center, a bolt being positioned within said center of said ball bearing and said hole of said top base wherein coupling said top base to said bottom base, said ball bearing of said bottom base being configured for rotating said top base relative to said bottom base, said bottom base further including:

a slot being configured for inserting a seat belt through, said slot being a conduit, said slot having a pair of openings, said pair of openings of said slot being positioned on said wall of said bottom base;

a port being positioned on said wall of said bottom base, said port being a universal serial bus port, said port being positioned proximate to said bottom surface of said bottom base, said port being configured for providing electrical current;

a battery being in electric communication with said port, said battery being positioned within said interior of said bottom base, said battery being configured for being a disposable battery, said battery being configured for providing electric current to said port; and a pair of straps protruding out from said wall of said bottom base, each of said straps being positioned coplanar to each other, each of said straps having an end, a pair of clasp lock fasteners being positioned on a respective one of said end of said pair of straps, said pair of straps being configured for retaining said bottom base to a bench seat; and one of a padded seat and a car seat being positioned upon said top surface of said top base, wherein said padded seat having an upper surface and a lower surface, said padded seat having a wall, said lower surface of said padded seat having a plurality of cavities, each of said cavities having a notch, said plurality of cavities of said padded seat being complementary to said plurality of latches of said top base, said lower surface of said padded seat being configured for securing to said top surface of said top base by positioning said indent of each of said latches in a respective one of said notch of each of said cavities, said padded seat having a plurality of clasps positioned on said wall, a padding being positioned on said upper surface of said padded seat, said padding having a plurality of buttons, each of said buttons of said padding engaging by clasp button fastening to a respective one of each of said clasps of said padded seat; and said car seat having a locking surface, said locking surface having a plurality of cavities, each of said cavities having a notch, said plurality of cavities of said car seat being complementary to said plurality of latches of said top base, said locking surface of said car seat being configured for securing to said top surface of said top base by positioning said indent of each of said latches in a respective one of said notch of each of said cavities, said car seat being configured for securing a child within said car seat.

\* \* \* \* \*